Feb. 21, 1950 E. H. MUELLER 2,498,376
VALVE FOR GAS BURNERS
Filed July 24, 1946 2 Sheets-Sheet 1
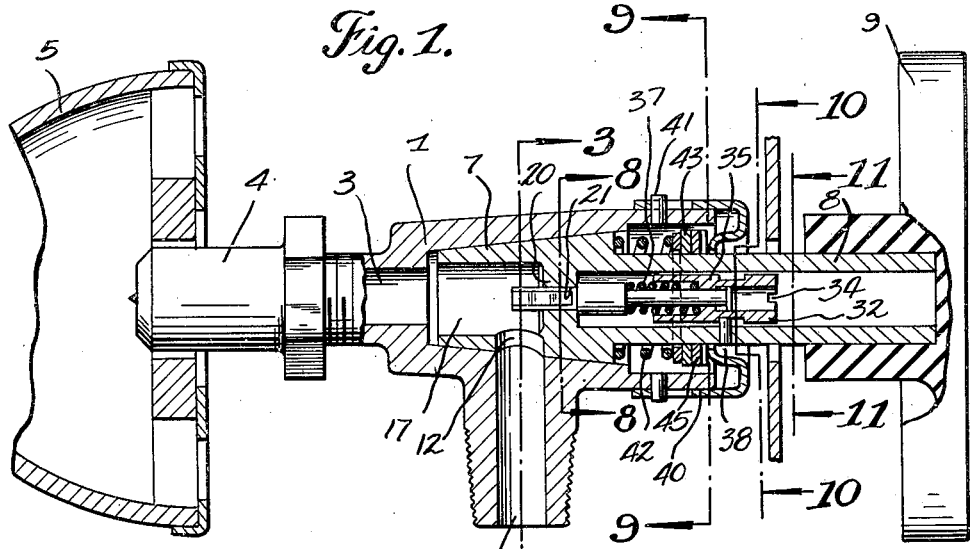
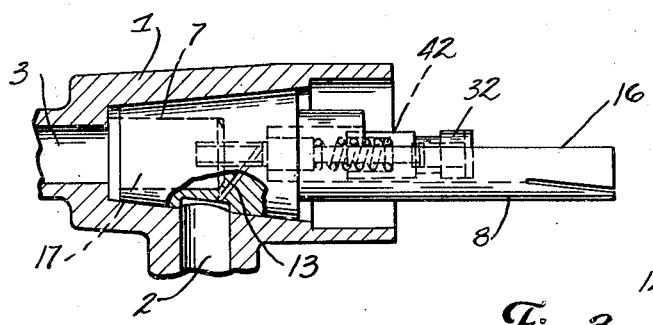
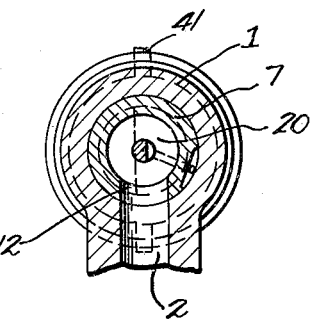
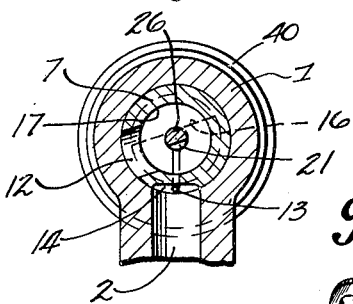
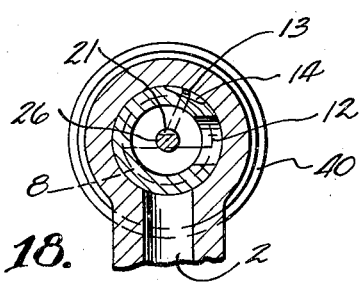
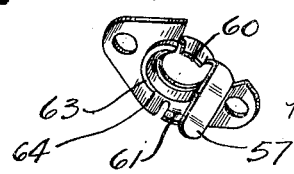
INVENTOR.
Ervin H. Mueller
BY
Barnes, Kisselle, Laughlin & Raisch
ATTORNEYS.

Feb. 21, 1950 — E. H. MUELLER — 2,498,376
VALVE FOR GAS BURNERS
Filed July 24, 1946 — 2 Sheets-Sheet 2
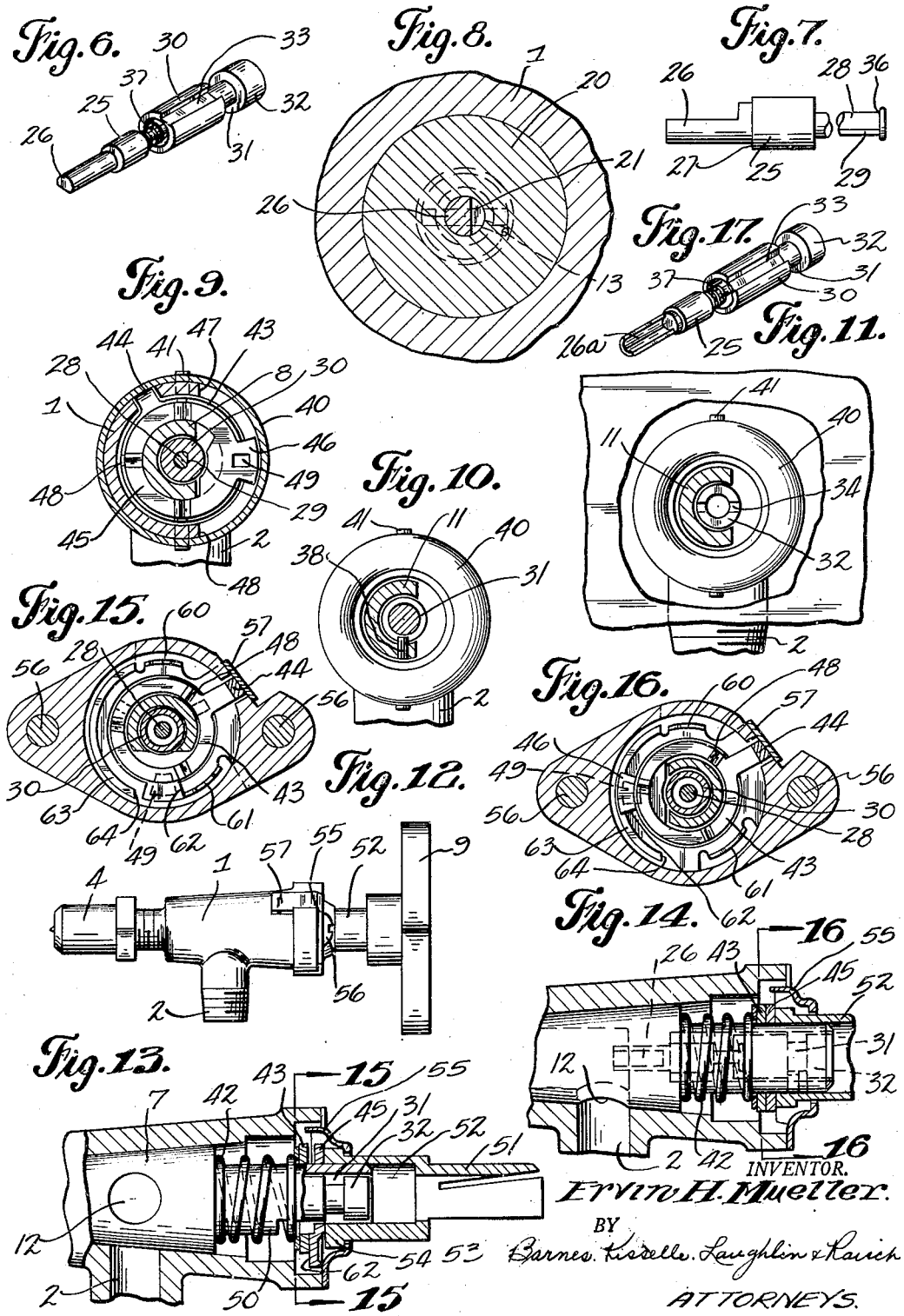
INVENTOR.
Ervin H. Mueller
BY Barnes, Kisselle, Laughlin & Raisch
ATTORNEYS.

Patented Feb. 21, 1950

2,498,376

UNITED STATES PATENT OFFICE 2,498,376

VALVE FOR GAS BURNERS

Ervin H. Mueller, Grosse Pointe, Mich.

Application July 24, 1946, Serial No. 686,031

2 Claims. (Cl. 277—41)

This invention relates to valves and it has to do particularly with a valve designed and intended particularly for use in controlling the flow of gaseous fuel to a burner.

The general obect of the invention is to provide an improved valve construction which can be manipulated to provide a wide opening therethrough for the flow of a relatively large volume of gas for supporting a high or full-on flame and to provide a smaller or more restricted opening for supplying a smaller volume of gas for a lower or simmering flame. Included in the objects is a construction which provides for the adjustment of the passage for the gas for the simmering flame and this adjustment can, due to the structure of the valve, be made from a convenient location and particularly by an adjustable element positioned on the axis of the stem of the valve. Moreover, the structure provides an improvement wherein a locking valve can be provided, that is, a valve which locks itself in one or more desired positions, and at the same time the simmer adjustment may be made on the axis of the valve. Other objects will become apparent as the following detailed description is considered. The drawings show structures for carrying out the invention and in these drawings:

Fig. 1 is a sectional view taken through the valve constructed in accordance with the invention showing the valve in full-on position.

Fig. 2 is a view similar to Fig. 1 showing valve parts in simmer position.

Fig. 3 is a sectional view taken through line 3—3 of Fig. 1 showing the valve in off position.

Fig. 4 is a view similar to Fig. 3 showing the valve in full-on position.

Fig. 5 is a sectional view similar to Figs. 3 and 4 showing the valve in simmer position.

Fig. 6 is a perspective view of a sub-assembly of parts for controlling the simmer passageway.

Fig. 7 is an enlarged side elevational view of one of the parts of the sub-assembly.

Fig. 8 is a large sectional view taken substantially on line 8—8 of Fig. 1 showing the controllable simmer passageway.

Fig. 9 is a sectional view taken substantially on line 9—9 of Fig. 1 showing some of the controlling mechanism for the operation of the valve.

Fig. 10 is a view taken substantially on line 10—10 of Fig. 1 showing how the controlling sub-assembly is held in position.

Fig. 11 is a view taken substantially on line 11—11 of Fig. 1 illustrating the stem structure.

Fig. 12 is a side elevational view of a modified form of valve of the locking type.

Fig. 13 is a slightly enlarged sectional view of the modified form of valve.

Fig. 14 is a view similar to Fig. 13 showing the valve in on position.

Fig. 15 is a sectional view taken substantially on line 15—15 of Fig. 13 showing some of the controlling structure.

Fig. 16 is a sectional view taken substantially on line 16—16 of Fig. 14.

Fig. 17 is a view of a modified form of a control element for governing the simmer passage.

Fig. 18 is a view illustrating the structural features of the cap of the locking-type valve.

As will be seen by reference to Fig. 1, the valve body at 1 is constructed so that it has an inlet passage 2, an outlet passage 3, and a cap 4 from which the gaseous fuel is projected into a suitable mixer tube 5 of a burner. The valve body has a tapered chamber therein in which is located a tapered plug valve member 7 provided with a stem 8 for receiving an operating handle 9.

The valve member 7, as shown in Figs. 3, 4 and 5, has a port 12 which may be aligned with the inlet passage 2, as shown in Fig. 1, to provide a full flow of gas. Angularly removed from the port 12 is a passage 13. This passage, as shown in Fig. 2, extends angularly and the passage 13 preferably opens into the surface of the valve member by means of an enlarged recess 14 which collects lubricant and the like to prevent the plugging of the passage 13. The valve is in off position, as shown in Fig. 3; when the valve member is turned about 90° to the position shown in Fig. 4, the port 12 is in alignment with the inlet tube for full-on position; further rotary movement aligns the recess 14 with the inlet tube and this is the simmer position.

As shown in Fig. 1, the stem 8 of the valve is hollow and it is furthermore slabbed off as at 16 to provide a D-construction for receiving the handle 9. Between the hollow portion of the stem and the axial passage 17 in the plug is a partition or wall 20 provided with an aperture 21. The passage 13, as shown in Fig. 2, extends angularly and connects into the aperture 21.

The control for the flow of gas through the simmer pasage 13 resides in a sub-assembly, shown in Fig. 6, and this sub-assembly, as illustrated in Fig. 1, is disposed within the hollow stem. One part of the assembly comprises a small valving or controlling element as shown in Fig. 7. This has a central body portion 25 with an extending part which is D-shape in cross section as illustrated at 26. This construction provides a shoulder 27. On the opposite side of the body is an extending part 28 which also is slabbed as at 29 to provide a D-formation. A cooperating part of the sub-assembly comprises a body member 30 which is of such a size, as shown in Fig. 1, as to nicely fit within the hollow stem. This member has a circumferential groove 31 providing a head portion 32 and it has a lengthwise extending slot 33. The head portion 32 is notched to receive a tool such as a screw driver as shown at 34. This cooperating member has an apertured intermediate part 35. These two parts are assembled together in a sub-assembly by passing the projecting portion 28 through the apertured part 35 and by heading or flattening the end as at 36. A spring 37 is interposed between the two members.

In the handle 11 is a pin 38 which projects into the hollow of the stem. The sub-assembly is placed within the hollow stem by pushing it into position when the handle 9 is removed and the valve portion 26 enters the aperture 21. The pin 38 passes through the slot 33 and enters the groove 31 and by turning the assembly with a screw driver, the groove 33 is dis-aligned from the pin and the sub-assembly is held positioned as shown in Fig. 1. In this position, the spring 37 is compressed and it holds the shoulder 27 against the wall 20 which provides a seat therefor. This provides a positive seal against the escape of gas. To make an adjustment, a tool is passed into the hollow stem 8 and engaged in the slot 34 for turning the sub-assembly. The flat part 29 of the extension 28 gives this extension a D-shape and the aperture in the part 35 is similarly formed so that rotation of the member 30 causes rotation of the member 25. In this action, the D-formation of the valving part 26 serves to throttle the end of the passage 33 which communicates into the passage 21. Thus, the size of the passage for the gas for a simmering flame can be adjusted. To do this it is only necessary to remove the handle 9 and pass a suitable tool, such as a screw driver, into the hollow stem.

A modified form of control for the simmer gas is shown in Fig. 17. In this form the part 26a instead of being in the form of a D in cross section, is hollowed out so that it forms a U-shaped trough or passage. It will readily be appreciated how one edge or the other of the U-form can be adjusted relative to the outlet end of the passage 13 to throttle the same.

The remaining structure of the valve resides in the cap 40 which may be attached to the valve body as by means of bayonet slots catching over studs 41, a spring situated between the plug valve and the cap to hold the valve on its seat, and between the spring and the cap may be an arrangement of washers for controlling and indicating the movements of the valve. The innermost washer 43 is keyed to the valve body as at 44 (Fig. 9); the outermost washer 45 has a projection 46 which operates between stops 47 and 48 on the body to limit the rotary movement from the positions shown in Figs. 3 and 5. These washers have cooperating recesses and humps 48 and 49 arranged to snap into interfitting relationship when the valve is in the intermediate position which, as shown in Fig. 4, is in a full-on position. This position of the two washers is indicated in Fig. 9. This arrangement of washers, however, may or may not be used as desired with the simmer control structure.

The modified form shown in Figs. 12 to 16 embodies the same simmer control structure but combines therewith a locking valve arrangement in that the valve is locked in at least one position shown herein as the off position. Such parts, as have already been described and which are the same in the two valve structures, have the same reference characters applied thereto thus dispensing with needless duplication of description. These include a main valve body, a valve member, the operating handle, the ports therein, the spring for seating the valve and the clicking washers for indicating the intermediate full-on position.

In this form the valve stem 50 is relatively short as indicated in Fig. 13. The operating stem is, in effect, in two pieces, there being a secondary stem part 51 for receiving the handle 9, and it has a hollow portion, as shown at 52, which fits over the D-shaped part of stem 50 and has a thickened wall portion 53 for fitting on the flat side of the D to form a driving connection between the two. The secondary stem portion has a circumferential flange 54 which lies within a cap 55, secured to the body by screws 56. The cap has a tongue 57 which embraces the body so that the cap can be assembled only in one position. This tongue may overlie the key 44 for the washer 43 which keys the same to the body. The cap has an inwardly extending stop 60 and another inwardly extending slot 61 (Fig. 18) between which the projection 62 of the washer 45 functions in its extreme positions. Fig. 15 shows the projection 62 against the stop 61 which is in the off position. The spring 42 urges the washers against the flange 54 of the secondary stem piece which, in turn, reacts against the cap. This pushes the washers to the right as Fig. 13 is viewed. The cap has a raised rib 63 which provides a shoulder 64 and, accordingly, in the off position the projection 62 lies between the stop 61 and the shoulder 64, and the valve cannot be turned. To operate the valve, the operator pushes axially on the handle 9 to push the secondary stem inwardly thus to compress the spring 42, as shown in Fig. 14. This moves the projection 62 into a plane where it will pass over the shoulder 64 so that the valve may be turned. As shown in Fig. 16 the valve has been turned about 90° from off position to full-on position and in this position the interfitting projections and recesses and the two washers snap into interengagement to indicate the full-on position. The dis-alignment of the interfitting projections and recesses in Fig. 15 is indicated.

Here again the particular snapping arrangement of the washers may be varied, the important thing being a locking valve which embodies a two-piece stem, one of which is axially shiftable to disengage the locking action for the operation of the valve in conjunction with axially positioned means for controlling the flow of gas for the simmer flame.

I claim:

1. In a valve for controlling the flow of gas to a burner, said valve having a body, a valve member turnable in the body, and having a port and a passage which, in different positions of the valve member, provide relatively large volume and low volume flow of gas respectively, a cap for the valve body, a hollow stem on the valve member, a hollow secondary stem part slidably and nonrotatably connected to the stem and adapted to receive an operating handle, the secondary stem part having a flange inside the cap, locking means slidably and non-rotatably mounted on the stem, abutment means for engaging the locking means to lock the valve member against rotation, a spring positioned between the locking means and the valve member to normally hold the locking means in locked position and holding the flange of the secondary stem part against the inside of the cap, whereby axial movement of the secondary stem part against the spring disengages the said locking means from the abutment on the cap for the turning of the valve member, and metering means for the said passage comprising, elements mounted in the hollow stem for rotatable adjustment with respect to said passage and constructed to be engaged by a turning tool passed through the hollow secondary stem part.

2. In a valve for controlling the flow of gas to a burner, having a body member and a valve member turnable therein, a hollow operating stem for the valve member, the valve member having an outlet passage, there being an opening between the hollow of the stem and the outlet passage with the opening being in substantial alignment with the hollow of the stem and smaller than the hollow of the stem to provide a shoulder at the intersection of the hollow of the stem and the opening and a gas flow passage communicating with said opening; a projection extending into the hollow of the stem, a sub-assembly in the hollow stem comprising, an element with a metering portion extending into said opening and an enlarged part for engaging the shoulder to provide a gas seal, a second element rotatably fitting in the hollow of the stem and accessible through the hollow of the stem, said two elements being slidably and non-rotatably connected together, a spring between the two elements normally tending to separate the same, means holding the two elements and the spring in sub-assembly against the action of the spring, the second element having a lengthwise extending slot and a circumferential groove communicating therewith, the second element being placeable in the hollow stem by passing the slot over said projection, and by turning the second element to position the projection in the circumferential groove to provide a reaction for the spring, whereby the spring holds the enlarged part of the first element against the shoulder, the metering element adapted to meter the passageway as it is turned on its axis incident to turning the second element.

ERVIN H. MUELLER.

REFERENCES CITED

The following references are of record in the file of this patent:

UNITED STATES PATENTS

| Number | Name | Date |
| --- | --- | --- |
| 1,988,819 | Stuart | June 22, 1935 |
| 2,249,982 | Rutherford | July 22, 1941 |
| 2,259,592 | Suvak | Oct. 21, 1941 |